Sept. 29, 1970 M. MAKIN 3,531,015

LOCKING MEANS FOR ICE CREAM CONTAINERS

Filed Oct. 9, 1968

INVENTOR
Maurice MAKIN

Alan Swabey

ATTORNEY

United States Patent Office 3,531,015
Patented Sept. 29, 1970

3,531,015

LOCKING MEANS FOR ICE CREAM CONTAINERS

Maurice Makin, 630 Carroll Ave., Lasalle, Quebec, Canada

Filed Oct. 9, 1968, Ser. No. 766,123
Int. Cl. B65d *25/00*
U.S. Cl. 220—85 2 Claims

ABSTRACT OF THE DISCLOSURE

A cylindrical walled ice cream container having external tongue-like members extending substantially tangentially to the cylindrical wall and interlocking with tongue-like members on an adjacent container to prevent rotation of the first container in at least one direction when scooping out the ice cream.

BACKGROUND OF THE INVENTION

Field of the invention

This invention relates to improvements in ice cream containers, particularly those of one-gallon size or larger, which are of the type adapted to be stored in a top-opening freezer chest and from which the ice cream is dispensed by scooping and placing it in cones. The improvement resides in providing means on the containers which prevents rotation of a container in at least one direction while ice cream is being scooped out.

Description of the prior art

A problem exists in dispensing ice cream from containers through scooping out the ice cream using a mechanical scoop. The ice cream within the container is firmly packed, and when pressure is applied to the scoop to dig into the ice cream, the container together with the ice cream quite often rotates and prevents the ice cream from being picked up by the scoop. Usually the person attempting to scoop out the ice cream has to hold the container with one hand to prevent its rotation while scooping with the other.

Various attemps have been made in the past to prevent the rotation of the containers when dispensing ice cream. The most common methods now used comprises using a detachable stainless steel spring clamp to clamp together the touching edges of adjacent cylindrical containers. The clamp, however, is relatively expensive, being made of stainless steel, and, being a separate item, is often lost.

SUMMARY OF THE INVENTION

The purpose of the present invention, therefore, is to provide inexpensive and simple means permanently fixed to, or capable of being permanently fixed to cylindrical ice cream container for preventing its rotation in a freezer chest in at least one direction.

The rotation-prevention means comprises at least one external tongue-like member on the container adjacent to the cylindrical wall of the container and extending in a direction substantially tangentially to the cylindrical wall. The tongue-like member interlocks with a second tongue-like member on an adjacent container to prevent rotation of the container as ice cream is being scooped out.

BRIEF DESCRIPTION OF THE DRAWINGS

The invention will now be described in detail having reference to the accompanying drawings, in which.

DESCRIPTION OF THE PREFERRED EMBODIMENT

Figures 1, 2, 3, 4, 5, 6, 7, 8, 9, 10:
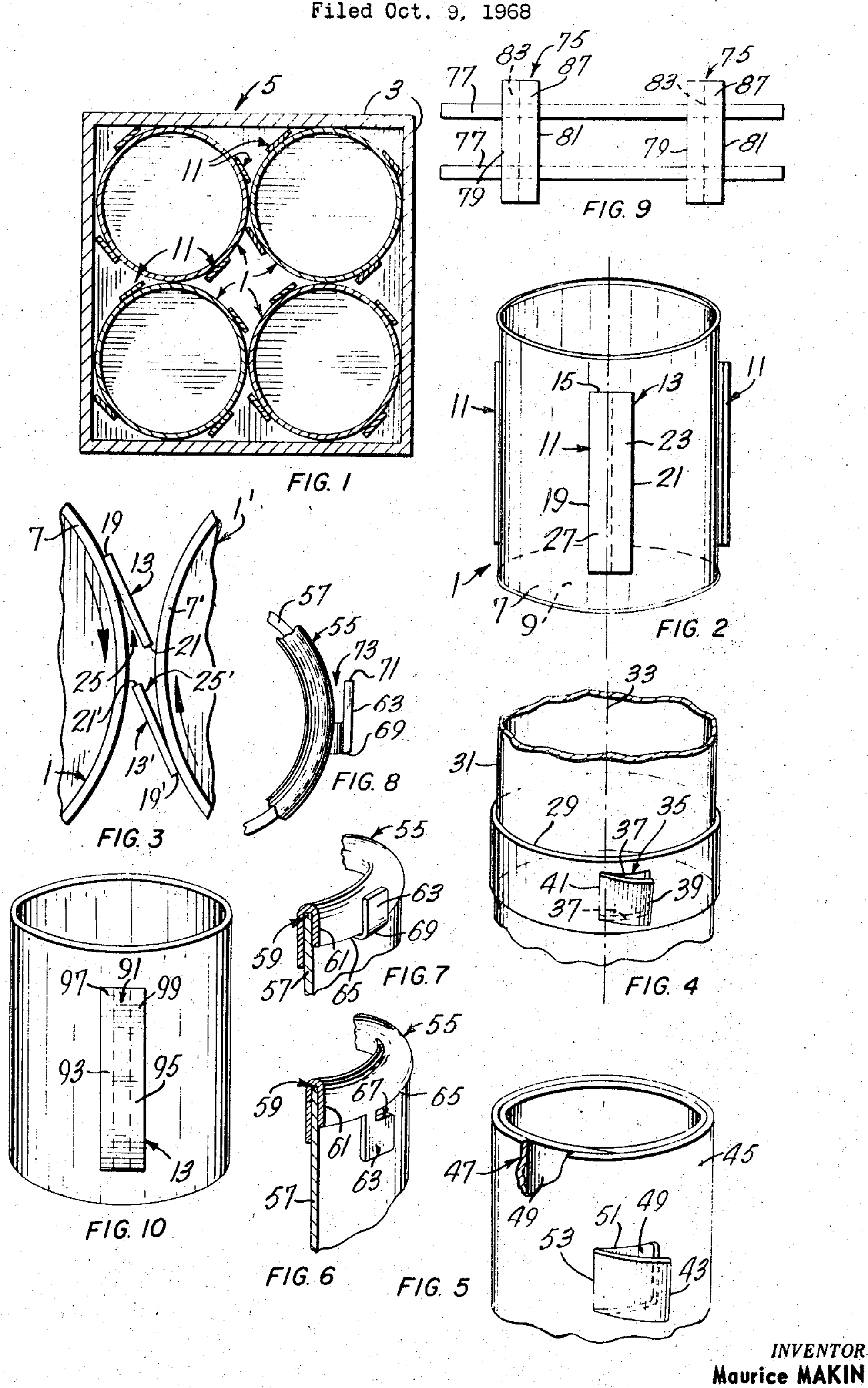
FIG. 1 is a plan view showing a typical arrangement of cylindrical ice cream containers in a freezer chest.
FIG. 2 is a schematic view showing one form of the rotation-prevention means on an ice cream container.
FIG. 3 is a detailed plan view showing two interlocking ice cream containers having rotation-prevention means of the type shown in FIG. 2.
FIG. 4 schematically illustrates another embodiment of the rotation-prevention means for an ice cream container.
FIG. 5 schematically illustrates a still further embodiment of the rotation-prevention means for an ice cream container.
FIGS. 6 and 7 schematically illustrate a further embodiment of the rotation-prevention means for an ice cream container.
FIG. 8 is a plan view of the rotation-prevention means shown in FIG. 7.
FIG. 9 illustrates a further embodiment of the invention permitting rotation-prevention means to be attached to the containers just prior to their use in a freezer chest.
FIG. 10 illustrates another embodiment of the rotation-prevention means.

As shown in FIG. 1, cylindrical ice cream containers 1 of a gallon size or larger are positioned within the side walls 3 of an open top freezer chest 5 in generally abutting relationship. The tops of the containers are open and the ice cream is dispensed by scooping it from the containers. Only four containers are shown in FIG. 1, but the invention can be used where fewer or more containers are placed in abutting relationship in a freezer chest. As shown in FIGS. 2 and 3, the ice cream containers 1 comprise a cylindrical wall 7 and a circular bottom 9. As the ice cream is scooped from about the cylindrical wall 7 of one of the open containers, the container tends to rotate in the direction of scooping. To prevent its rotation, rotation-prevention means 11 are located on and adjacent the cylindrical wall 7 of each container. The rotation-prevention means 11 includes at least one external tongue-like element 13 on the container extending in a direction substantially tangentially from the cylindrical wall 7.

The tongue-like element 13 is preferably formed by attaching a strip 15 of cardboard or other suitable stiff material, to the cylindrical wall of the container. The strip 15 extends in a vertical direction on the container wall parallel to the axis 17 of the container. The strip 15 is attached adjacent one vertical edge 19 only, leaving the other edge 21 free with the vertical portion 23 of the strip adjacent the free edge 17 forming the tongue-like element 13. The tongue-like element 13 extends substantially tangentially from the cylindrical wall 7 of the container and forms a narrow pocket 25 between itself and the cylindrical wall. As shown in FIG. 3, the pocket 25 will receive the free edge 21' of an identical tongue-like element 13' attached adjacent its edge 19' to wall 7' of an adjacent container 1′ with the tongue-like element 13 on the first container 1, fitting into the pocket 25′ on the adjacent container 1′. Upon placing containers 1, 1′ in a freezer chest in the position shown in FIG. 3, they can then be rotated slightly as shown by the arrows so that the tongue-like elements 13, 13′ interlock the containers 1, 1′ together to prevent the rotation of either container in one direction while ice cream is being scooped out. The strip 15 can be attached along a one-half vertical portion 27 of their area adjacent edge 19 to the container wall by a suitable adhesive leaving the other one-half vertical portion 23 of the strip free to form the tongue-like element 13. The strip 15 can also be attached to the container wall adjacent one vertical edge 19 by other suitable attaching means such as by stitching or using stainless steel staples.

While FIG. 2 shows a single elongated strip 15 extending over a substantial portion of the height on the container, several shorter strips could be used instead extending in a line on the cylindrical wall parallel to the container axis 17. Further, a plurality of strips 15 may be attached at spaced locations about the peripheral surface of the container as shown in FIGS. 1 and 2. Preferably, the strips 15 are attached at locations spaced 90° from each other so that if the container is used in larger freezer chests where a container may be abutted on all sides by adjacent containers, the tongue-like elements 13 formed from the strips can cooperate with tongue-like elements on each of the adjacent containers to prevent their rotation. The strips 15 can also be adjacent either edge 19 or 21 to prevent rotation in one or the other direction.

In another embodiment of the invention, as shown in FIG. 4, the rotation-prevention means can comprise a collar member 29 made of a strip of cardboard or other suitable material and fastened to the outside of the cylindrical container 31 with adhesive or other suitable fastening means. The collar 29 can be attached during manufacture of the container or just prior to insertion of the container in the freezer chest. The collar 29 extends about the container perpendicularly to the axis 33 of the container. A substantially U-shaped cut 35 is made in the collar prior to its attachment to the container with the arms 37 of the U-shaped cut extending perpendicular to the axis of the container when the collar is attached. The cut 35 forms a flap or tongue-like member 39. This element is not attached to the container and with the collar in place can be bent away from the container wall along fold line 41 adjoining the ends of arm 37 of the cut to extend substantially tangentially to the container wall to interlock with an identical flap or tongue-like member formed in a collar member on an adjacent container. A plurality of flaps may be formed in each collar member at spaced apart locations. More than one collar member may be affixed to the container spaced axially from one another.

In another embodiment of the invention shown in FIG. 5, tongue-like members 43 or flaps may be formed directly from the cylindrical wall 45 of the ice cream container. Some containers are constructed using two layers 47, 49 of material. The outer layer 47 can be scored with a U-shaped cut 51 similar to that made in previously described collar member 29 and the flap or tongue-like member 43 formed by the cut can be separated or peeled away from inner layer 49 to extend substantially tangentially to the cylindrical container wall 45. The flap 43 remains attached to the outer layer 47 along fold line 53. A plurality of such flaps can be formed about the surface of the container wall to interlock with similar flaps formed on adjacent containers. Where the container wall is made of a single layer of material and the material layer is relatively thick, the flaps could be formed by scoring part way through the outer surface of the container wall to a predetermined depth to define a U-shape and then peeling back the material within the score line.

A further embodiment of the invention is shown in FIGS. 6, 7 and 8. The ice cream containers are normally provided with a metal ring 55 at the top edge 59 of the cylindrical wall 57 to provide some rigidity to the container. The metal rings are formed to enfold the edge 59 of the container wall 57 as shown in FIG. 6, for example. The metal ring can be constructed to proivde rotation-prevention means for the container. The outer wall 61 of the ring may be formed with one or more tab projections 63 extending downwardly from the lower edge 65 of the outer wall 61 of the ring as shown in FIG. 6. A slot 67 extends laterally part way through the tab projection 63. The slot 67 may be aligned with edge 65 of the ring wall. With the ring 55 attached to the container, the projection 63 is bent double upwardly along a fold line 69 adjacent slot 67 to a position adjacent the outer wall 61 of the ring as shown in FIGS. 7 and 8. The now upward extending projection 63 forms a tongue-like member 71 which can be further bent in a vertical plane to extend substantially tangentially from the wall 57 as shown in FIG. 8. A pocket 73 is formed between the outer wall 61 of the ring and the tongue-like member 71. The tongue-like member 67 and pocket 73 cooperate with a tongue-like member and pocket formed on a ring on an adjacent container to interlock the containers and prevent rotation.

Still another embodiment of the invention is shown in FIG. 9, where one or more elongated vertical strips 75 of cardboard or similar stiff material, identical to strips 15 shown in FIG. 2, may be attached to one side of a spaced pair of narrow bands 77 of fabrics or other suitable material having a pressure-sensitive adhesive coating on one side opposite the side to which the strips 75 are attached. The strips 75 are attached to the bands adjacent one vertical edge 79 only leaving a free vertical edge 81. The strips 75 preferably are also coated with a pressure sensitive adhesive along one vertical side portion 83 adjacent edge 79. The bands 77, having the attached strips 75, are wrapped around and attached to a container by the pressure sensitive adhesive on the bands and on the side portions 83 of the strips to position the strips 75 vertically, parallel to the container axis, on the wall of the container. The remaining un attached vertical portion 87 of the strips 75 adjacent free edge 81 form tongue-like members similar to members 13 shown in FIG. 2. The bands 77 and attached strips 75 provide a simple unit easily attached to a container immediately prior to its placement in a freezer chest to provide it with rotation-prevention means.

The tongue-like members or flaps of the various embodiments shown may be formed to extend in either or both a clockwise or counterclockwise direction about the cylindrical container to prevent rotation in either or both directions. The strip 13 shown in FIG. 2, for example, could be attached to the container wall along a central vertical extending area 91 as shown in FIG. 10, for example, with both vertical edges 93, 95 unattached and the unattached adjacent vertical portions 97, 99 of the strip forming tongue-like members extending substantially tangentially in opposite directions from the container wall to prevent rotation in either direction when interlocked with tongue-like members on adjacent containers.

I claim:

1. A system for use in dispensing ice cream comprising at least two containers, each having a substantially cylindrical wall, ice cream within each container, an elongated, tongue-like member projecting substantially tangentially from said cylindrical wall of each container and terminating in a free end, said elongated, tongue-like member having its longitudinal axis substantially parallel to the axis of said cylindrical wall, means connecting said tongue-like member to said cylindrical wall, said tongue-like member on each container projecting tangentially from each wall a sufficient distance to permit said tongue-like member on one of said containers to interlock with the tongue-like member on the other adjacent container to prevent rotation of said containers when said containers are in use in an ice cream cooler.

2. A system as defined in claim 1, wherein said means for attaching comprises adhesive means adjacent the end of said member remote from said free edge connecting said member to said wall.

References Cited

UNITED STATES PATENTS

| | | | |
|---|---|---|---|
| 1,206,872 | 12/1916 | Lockwood | 220—23.2 |
| 1,729,942 | 10/1929 | Hoeft | 220—85 |
| 2,257,569 | 9/1941 | McCarthy | 220—17 |
| 2,454,438 | 11/1948 | Falk et al. | 217—69 XR |
| 2,552,474 | 5/1951 | Amberg. | |
| 2,812,099 | 11/1957 | Eugan | 220—23.4 |

FOREIGN PATENTS

| | | | |
|---|---|---|---|
| 11,427 | 1905 | Great Britain. | |

RAPHAEL H. SCHWARTZ, Primary Examiner

U.S. Cl. X.R.

206—65; 99—180